March 22, 1949.  E. BODMER  2,464,844
HORIZONTAL TURRET FOR AUTOMATIC LATHES
Filed June 18, 1945
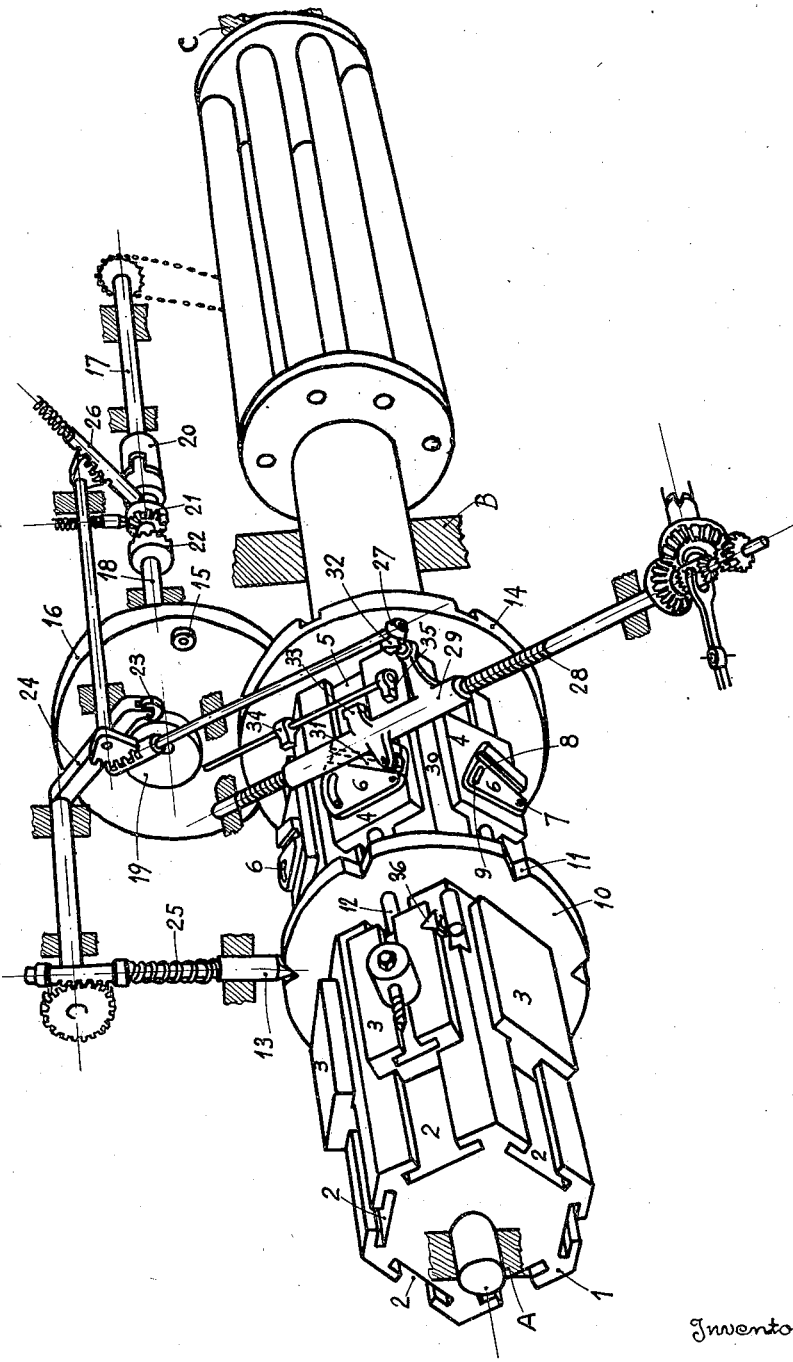
Inventor
*Ernest Bodmer*
By *Emery Droff*
Attorney Patented Mar. 22, 1949

2,464,844

UNITED STATES PATENT OFFICE 2,464,844

HORIZONTAL TURRET FOR AUTOMATIC LATHES

Ernest Bodmer, Grand-Lancy-Geneva, Switzerland

Application June 18, 1945, Serial No. 600,116
In Switzerland August 21, 1944

5 Claims. (Cl. 29—41)

In known automatic and semiautomatic turret lathes, the design of the turret differs materially from one type of machine to another.

There are, for instance, turrets with horizontal axis parallel to the axis of the spindle of the machine, others whose axis is also horizontal but at right angles to the axis of the spindle; others again have a vertical axis perpendicular to the axis of the spindle.

Turrets with horizontal axis perpendicular to the spindle possess the drawback that the locking of the turret is not satisfactory. In fact the locking means must necessarily be placed between the cutting part of the tool and the axis on which the turret is pivoted, that is to say on a short lever arm, in such a way that the play existing between the members of the locking device is transmitted on to the cutting part of the tool according to the ratio between the arms of the lever. But since this ratio is always very small, these turrets never allow precision work to be done.

To obviate this inconvenience, certain designers have replaced this turret as just described by a turret with horizontal axis, but parallel to the axis of the spindle, in such a way as to allow a better and positive locking of the turret by placing the lock at a relatively great distance from the axis of rotation of the turret, for example at the same distance as the cutting part of the tool. The drawback of this type of turret consists in the fact that all the tools mounted on the said turret are rigidly connected to each other and advance simultaneously. In other words, during the working stroke of one of these tools, all the other tools mounted on the turret are displaced and interfere with or even prevent the simultaneous execution of other machining operations with tools carried by slides arranged in a star around the spindle.

To eliminate this drawback, certain designers have further improved their lathes by equipping them with a turret with horizontal axis parallel to the axis of the spindle and having a lock placed at a relatively great distance from the axis of rotation of the turret, each tool of which can be actuated individually. Nevertheless, one drawback arises from the fact that the tools of these turrets are fixed at the ends of spindles and that these cannot be made sufficiently rugged. It follows that these turrets do not allow a roughing operation to be effected simultaneously with a boring operation, for instance. In fact, these spindles cannot be guided very close to the cut, for the guiding members are too bulky and run the risk of interfering with the displacements of the other tool carriers and above all of hindering the removing of the chips.

To get over this difficulty, certain designers have made a further modification and provided turrets with horizontal axis and fitted with tool slides. The undeniable advantage of this design consists of its rigidity, but this advantage is to a certain extent counteracted by the fact that the lock of the turret is placed between the cutting point of the tool and the axis on which the turret is pivoted, and that the play existing between the members of the locking device is amplified in accordance with the lever ratio, in such a way that these turrets do not allow precision work to be done.

In addition, in the known types of turrets with tool slides, the members for actuating the slides are located within the axis of rotation of the turret, and this makes it necessary to provide openings in the block carrying the slides in order to provide passage for these actuating members. It is evident that these openings weaken the block carrying the slides in such a manner that these turrets do not allow complete realisation of the advantages of rigidity which should be expected from this type of turret.

Further, this type of turret with independent slides possesses another serious defect, since the indexing of the turret may be effected at any position whatever of any one of the slides. From this it follows that if, for some reason or other, one tool has remained stuck in the work-piece being machined, or if the control cam is badly keyed, the indexing of the turret may be effected when the tool is still engaged with the piece being machined, and this will cause the turret to be damaged.

The subject matter of the present invention is a horizontal turret for an automatic lathe, the axis of the turret being parallel to the axis of the lathe spindle and comprising tool carrying slides fitted on a rotary member and controlled alternately and independently from each other. This turret obviates the inconveniences cited above due to the fact that each tool slide is rigidly connected to an auxiliary slide carrying, mounted on its outer face, an actuating member designed to come into engagement with a member controlling the displacements of the slides carried by the rotary member of the turret.

Another object of the present invention is an actuating member constituted by a guide whose position is adjustable with respect to the path traversed by the control member.

Still another object is an interlocking device preventing the indexing of the turret as long as the actuated slide has not returned to its extreme position of rest.

Furthermore the present invention has for its object a locking device for the turret described in which the point of application of the lock on the rotary member of the turret is situated at a distance from the axis of rotation of the turret which is greater than the distance of the outer face of the tool slide from the said axis of the turret.

The accompanying sole figure shows by way of example a diagrammatic perspective view of one form of embodiment of a turret designed according to the present invention.

The turret illustrated by way of example in the accompanying drawing comprises a support 1 constituted of a rotary member, turning in the bearings A, B and C.

This rotary member of the turret is of hexagonal cross-section. Grooves 2, for guiding the principal tool slides 3, are provided in each of the faces of the hexagon rotary member. Each of the tool slides is rigidly connected by a bar 12 to an auxiliary slide 4 guided in grooves 5. Each of these auxiliary slides carries an actuating member for actuating the principal tool slides 3. In the form of embodiment here illustrated, these actuating members consist of sectors 6 having a radial groove 31 in their top face and pivoted at their apexes on pivots 7 rigidly connected to the auxiliary slides 4. The position of these sectors is angularly adjustable. For this purpose they are provided with preferably arcuate slots 8 in which is engaged a locking pin 9 screwed into the auxiliary slide 4.

The displacements of the slides 3 and 4 are caused by a control member consisting of a lead screw 28 on which is mounted a long nut 29. The latter carries a roller 30 designed to engage successively in the radial grooves 31 of the sectors 6, carried by auxiliary slides 4.

A disc 10, fixed rigidly on the rotary member of the turret between the ends of the respective grooves 2 and 5, has notches 11 to the number of six spaced uniformly on its periphery. These notches cooperate with a radially displaceable locking finger 13 fixing the angular positions of the rotary member.

At the rear of the hexagonal part this rotary member is rigidly fixed to a Maltese cross 14 with which cooperates a stud and roller 15 rigidly connected to a disc plate 16.

The controls of the locking devices and of the indexing of the rotating member of the turret are similar to the known devices generally employed to effect the locking and indexing of the turrets of automatic lathes. These control devices comprise a control shaft 17 turning continually, connected to a stub shaft 18 by means of a double coupling 20, 21, 22. The stub shaft 18 carries the disc plate 16 and a cam 19. A roller 23 carried by an arm 24 rolls on the profile of the cam 19 and controls the displacements of the notch engaging locking finger 13 against the force of a restoring spring 25 tending to keep this finger 13 in engagement with the notches 11.

The axial displacement of the movable part 21 of the double coupling is caused by the movement of a slide 26 actuated by a linkage system of interconnected rods carrying a stop 27, designed to come into engagement with a stop 32 carried by the elongated nut 29. When the stop 27 strikes the stop 32, it causes the slide 26 to move out of the annular diagonal groove shown in the member 21. The member 21 then moves to engage the member 22 under the action of a spring (not shown). Hence, power is delivered to the disc 16, which rotates, causing cam 19 to elevate lever 24 and, hence, finger 13. When stop 27 passes the stop 32, the slide 26 drops onto the member 21, and as the member 21 continues to rotate, the slide 26 intersects and falls into said diagonal groove, as a result of which further rotation of the member 21 urges it by virtue of the cam action of said diagonal groove acting against the slide 26 to be retracted from the member 22 and hence to stop the delivery of power to the disc 16 from the shaft 17.

The nut 29 also carries an arm or finger 33, the function of which is unnecessary to describe herein, and which relates to the subject matter of my co-pending applications Serial Nos. 600,112; 600,115 and 600,117, filed contemporaneously herewith.

The rotation of the lead screw 28 causes the nut 29 to be displaced along it from its position of rest, that is the position where the roller 30 is completely disengaged from the grooves 31. In the course of this displacement of the nut 29, the roller 30 engages in the groove 31 of the sector 6 of the auxiliary slide 4 connected to the particular tool slide 3 which is in the angular working position. From that moment, this slide 3 is actuated parallel to the axis of the spindle (not shown) of the lathe.

As can be seen, the rotary member of the turret may be made with a diameter sufficient to give all the requisite rigidity, even for roughing work on pieces of large diameter. In addition, one of the bearings as B may be arranged in the immediate proximity of the position of rest of the tool slides 3 and may be very large so as to have a very large bearing surface capable of taking without difficulty the greatest forces which may arise. Finally, as shown in the drawing, it is not necessary to provide any hollow space in the rotary member of the turret for the passage of control members controlling the displacements of the tool slides.

Another advantage of the present arrangement shown in the accompanying drawing is that the locking of the rotary member of the turret may be provided on the periphery of the drum or even on some still greater diameter. As a result, it follows:

(1) That the play inevitably present in the locking device is transmitted to the tool with a ratio of transmission at the most equal to unity;

(2) That the forces to which the locking device is subjected are relatively not large and that this device can easily be constructed in a manner to be able to stand, without any drawbacks or premature wear, the greatest forces which may occur;

(3) That the torque due to the push of the control member acting on the actuating member is not transmitted to the tool slide, so that the latter is subjected only to the forces arising from the machining operations themselves. From this it follows that the wear of the grooves 2 is slight and hence a high degree of precision is maintained for a long time.

The length and position of the working strokes of the different tool slides are determined by the angular position of each of the sectors 6, the displacement of the nut 29 on the lead screw 28 remaining always the same.

The certainty of operation is perfect since the indexing of the turret cannot occur before the actuated tool slide has returned to its position of rest. Finally, in order to prevent any untimely displacement of the slides, each of them is kept in the position of rest by a spring catch 36.

In one modification, the groove 31 is replaced by a cam face, the return of the slide being ensured by a spring tending to keep the lateral edge of the sector 6 in contact with the roller 30.

It is evident that the rotary member may be of any regular geometrical section, rectangular, pentagonal or polygonal, according to the number of tools with which it is to be fitted.

The groove 31 of the sectors 6 may be straight, curved or bent, the shape of the groove or guide being designed according to the law of displacement desired for the tool slide to which it is connected. One could, for instance, by mounting on the principal tool slide 3 an auxiliary tool slide perpendicular to the axis of the spindle, machine grooves or a front surface. In fact, for this it is sufficient to provide a groove 31 to lead the tool in the longitudinal working position, then to actuate the auxiliary tool slide by means of any known form of control device (cam, lead screw, etc.).

It will thus be seen that the described turret allows practically all kinds of machining to be effected such as grooves, collars, cones, threads, grinding, etc.

I claim:

1. In a horizontal turret for an automatic lathe having a spindle, a shaft parallel to the spindle of the lathe, a polygonal rotary head carried on said shaft, each side of said polygonal head being provided with two longitudinal slideways extending from its respective ends, principal tool slides respectively slidably received in the slideways extending from a first end of said head, auxiliary slides respectively slidably received in the slideways extending from a second end of said head, a plurality of individual connecting means fixedly interconnecting respectively the principal tool slide and the auxiliary slide on each said polygonal side, a disc plate carried by said polygonal head and having a diameter at least as large as the diameter of said head, a cam member adjustably mounted on each said auxiliary slide and comprising an engaging surface, control drive means comprising an actuating finger mounted for engagement with said engaging surface as said drive means moves for causing sliding displacement of said auxiliary slides, said disc plate having a plurality of peripheral notches corresponding respectively to the polygonal sides of said head, a locking finger mounted for sliding engagement into said notches, and means actuatable by said control drive means for removing said locking finger from locking engagement with a said notch when and only when said control drive means is in its position corresponding to the extreme inactive rest position of a said principal tool slide.

2. In a horizontal turret for an automatic lathe having a spindle, a shaft parallel to the spindle of the lathe, a polygonal rotary head carried on said shaft, a disc plate carried by said polygonal head intermediate its length and dividing the polygonal surfaces of said head into two sets of faces, said disc plate having a diameter at least as large as the diameter of said head, each said face of said head being provided with a longitudinal slideway, principal tool slides respectively slidably received in the slideways of the faces of a first one of said sets of faces, auxiliary slides respectively slidably received in the slideways of the faces of the second one of said sets of faces, a plurality of individual connecting means fixedly interconnecting respectively the principal tool slide and the auxiliary slide on each polygonal surface, a cam member adjustably mounted on each said auxiliary slide and comprising an engaging surface, control drive means comprising an actuating finger mounted for engagement with said engaging surface as said drive means moves for causing sliding displacement of said auxiliary slides and disc plate having a plurality of peripheral notches corresponding respectively to the polygonal sides of said head, a locking finger mounted for sliding engagement into said notches, and means actuatable by said control drive means for removing said locking finger from locking engagement with a said notch when and only when said control drive means is in its position corresponding to the extreme inactive rest position of a said principal tool slide.

3. A turret according to claim 2, said cam member being a block pivotally mounted for adjustable angular orientation and its engaging surface being a groove extending substantially radially from its said pivot and wherein said actuating finger is received.

4. A turret according to claim 2, said slideways and slides and connecting means being positioned on the outside of said head.

5. A turret according to claim 2, said disc plate being provided with a plurality of apertures, and said connecting means extending through said apertures in said disc plate respectively.

ERNEST BODMER.

REFERENCES CITED

The following references are of record in the file of this patent:

UNITED STATES PATENTS

| Number | Name | Date |
|---|---|---|
| 725,438 | Gridley | Apr. 14, 1903 |
| 1,215,000 | Cone | Feb. 6, 1917 |
| 1,567,790 | Drissner | Dec. 29, 1925 |
| 2,369,039 | Gocht | Feb. 6, 1945 |